United States Patent [19]
Takahashi

[11] Patent Number: 6,120,375
[45] Date of Patent: Sep. 19, 2000

[54] PLEASURE RIDE DEVICE

[75] Inventor: Kenichi Takahashi, Yokohama, Japan

[73] Assignee: Namco Ltd., Tokyo, Japan

[21] Appl. No.: 09/030,230

[22] Filed: Feb. 25, 1998

[30] Foreign Application Priority Data

Feb. 28, 1997 [JP] Japan .................................. 9-061984

[51] Int. Cl.$^7$ ...................................................... A63F 9/24
[52] U.S. Cl. .................................. 463/7; 463/31; 463/36
[58] Field of Search .................................. 463/36, 31, 30,
463/7, 6, 1; 273/148 B, 336; 472/59, 60,
61, 95, 96, 97, 98, 99, 103, 104, 105; 434/29,
55, 61, 62, 65, 69, 71, 307 R, 225, 258

[56] References Cited

U.S. PATENT DOCUMENTS

| | | |
|---|---|---|
| 3,940,130 | 2/1976 | Fawcett . |
| 3,997,979 | 12/1976 | Turner . |
| 4,498,676 | 2/1985 | Runner . |
| 5,180,338 | 1/1993 | Pinto . |
| 5,209,662 | 5/1993 | Fujita et al. . |
| 5,364,271 | 11/1994 | Aknin et al. . |
| 5,405,152 | 4/1995 | Katanics et al. . |
| 5,429,515 | 7/1995 | Greenwood . |
| 5,547,382 | 8/1996 | Yamasaki et al. . |
| 5,713,794 | 2/1998 | Shimojima et al. . |
| 5,848,939 | 12/1998 | Smith . |
| 5,860,861 | 1/1999 | Lipps et al. . |
| 5,865,624 | 2/1999 | Hayashigawa . |

FOREIGN PATENT DOCUMENTS

B2-4-70038  11/1992  Japan .

*Primary Examiner*—Valencia Martin-Wallace
*Assistant Examiner*—John Paradiso
*Attorney, Agent, or Firm*—Oliff & Berridge, PLC

[57] ABSTRACT

A pleasure ride device which can give an impression close to that of riding and controlling a real animal is provided. The pleasure ride device comprises a model animal device having the form of a model horse, with a main part rocked longitudinally by a straddling player, and controlling the horse in virtual space, and a computing means which, based on the rocking angle and a predetermined game program computes and shows on a display a virtual space in which the horse appears. The computing means, based on the detected rocking angle, computes the motion acceleration for each rocking cycle of the model animal device, and for each rocking cycle of the model animal device, accelerates the horse in time with the hooves hitting the ground.

10 Claims, 9 Drawing Sheets

PLEASURE RIDE DEVICE

BACKGROUND OF THE INVENTION

1. Field of the Invention

The present invention relates to a pleasure ride device in which a rider plays a game involving mounting a ride.

2. Description of the Prior Art

Games in which a player mounts a model vehicle such as a car, motorcycle, or bicycle, and maneuvers the vehicle while watching a display of virtual space on a screen, are well known. A game device of this sort is of relatively simple construction, since the vehicle is mechanical, even in the virtual space display.

However, in a game in which the rider mounts an animal such as a horse, a device modeling the animal is required, but it is difficult to impart to the player an impression close to that of controlling a real animal.

In particular, when the horse or other animal is running, in contradistinction to the case of a motorcycle or the like for which the acceleration is continuous, acceleration is discontinuous, according to the timing with which the animal's feet touch the ground. Conventionally, however, there has not been a case in which when the player is riding and controlling a model animal, the player obtains an impression of acceleration each time when the feet of the animal shown on the display touch the ground. As a result, there is the problem that the game appears unnatural to the player.

SUMMARY OF THE INVENTION

The present invention seeks to overcome the problems of the prior art, and has as its objective the provision of a pleasure ride device imparting an impression close to that of riding and controlling a real animal.

To achieve this object, there is provided a pleasure ride device comprising:

a model animal device having the form of a model animal, with a main part rocked longitudinally by a straddling player, and controlling a player character representing the animal in virtual space;

a rocking angle detection means for detecting a rocking angle of the model animal device; and a computing means for computing and showing on a display a virtual space in which the player character appears, based on a predetermined game program and the detected rocking angle;

wherein the computing means includes an acceleration computing means which computes the motion acceleration for each rocking cycle of the model animal device, based on the detected rocking angle, and for each rocking cycle of the model animal device, accelerates the player character within the virtual space at a certain timing.

The player straddles the model animal device which takes the form of a modeled animal, rocks in the longitudinal plane, and operates a player character representing the animal.

The computing means, based on a predetermined game program, computes and shows on a display a virtual space in which the player character appears. At this time, the rocking angle of the model animal device is detected, and the motion acceleration of the character is computed for each rocking cycle of the model animal device. Moreover, the player character moving in virtual space is accelerated in step with the rocking cycles of the model animal device.

In other words, the player character in virtual space is not accelerated continuously, but a construction is adopted whereby the acceleration occurs for each rocking cycle of the model animal device. By this means, an image of high realism can be shown in the display of the actual animal or a character similar thereto being accelerated discontinuously according to the motion action, and the player astride the model animal device can play the game with a feeling akin to that of controlling an actual animal.

The computing means may accelerate the player character in synchronization with the feet of the player character hitting the ground.

By this means, the game can be played with a feeling even more akin to that of controlling an actual animal.

In particular, the rocking action of the model animal device and the action of the feet of the player character striking the ground are linked, and the player character is acceleration-controlled. For this reason, the player watching the player character shown on the display while rocking the model animal device longitudinally and laterally obtains an impression of acceleration each time the feet of the model animal device ridden by the player actually hit the ground, and a pleasure ride device enabling a more interesting game is thus achieved.

The acceleration computing means may include:

a first means which, based on the detected rocking angle, computes the motion acceleration of the player character for each rocking cycle of the model animal device; and a second means for, based on the motion acceleration, accelerating the player character for each rocking cycle of the model animal device.

At this time, the first means may compute the motion acceleration for each rocking cycle, based on the maximum rocking angle in each rocking cycle and other game conditions.

The model animal device may have the form of a model animal having a head portion and a body portion, and such that a player can straddle the body portion, seize reins provided on the head portion, stand on a pair of footrests provided on the body portion, and operate so as to control the animal in virtual space.

By means of the movement of the head portion, body portion, and footrests of the model animal device, the player can obtain an impression like that of controlling an actual animal.

By vertical movement of the reins, the body portion may be rocked longitudinally, and the footrests may be rocked longitudinally according to the attitude of the player's body.

By movement of the reins, the body can be rocked. In particular, if the running speed, acceleration, and other factors are determined by the rocking of the body, the speed of the animal can be controlled by manipulation of the reins, and this is close to the manipulation of an actual animal.

DESCRIPTION OF PREFERRED EMBODIMENTS

The present invention is now described in terms of a preferred embodiment, with reference to the drawings.

Figure 2:
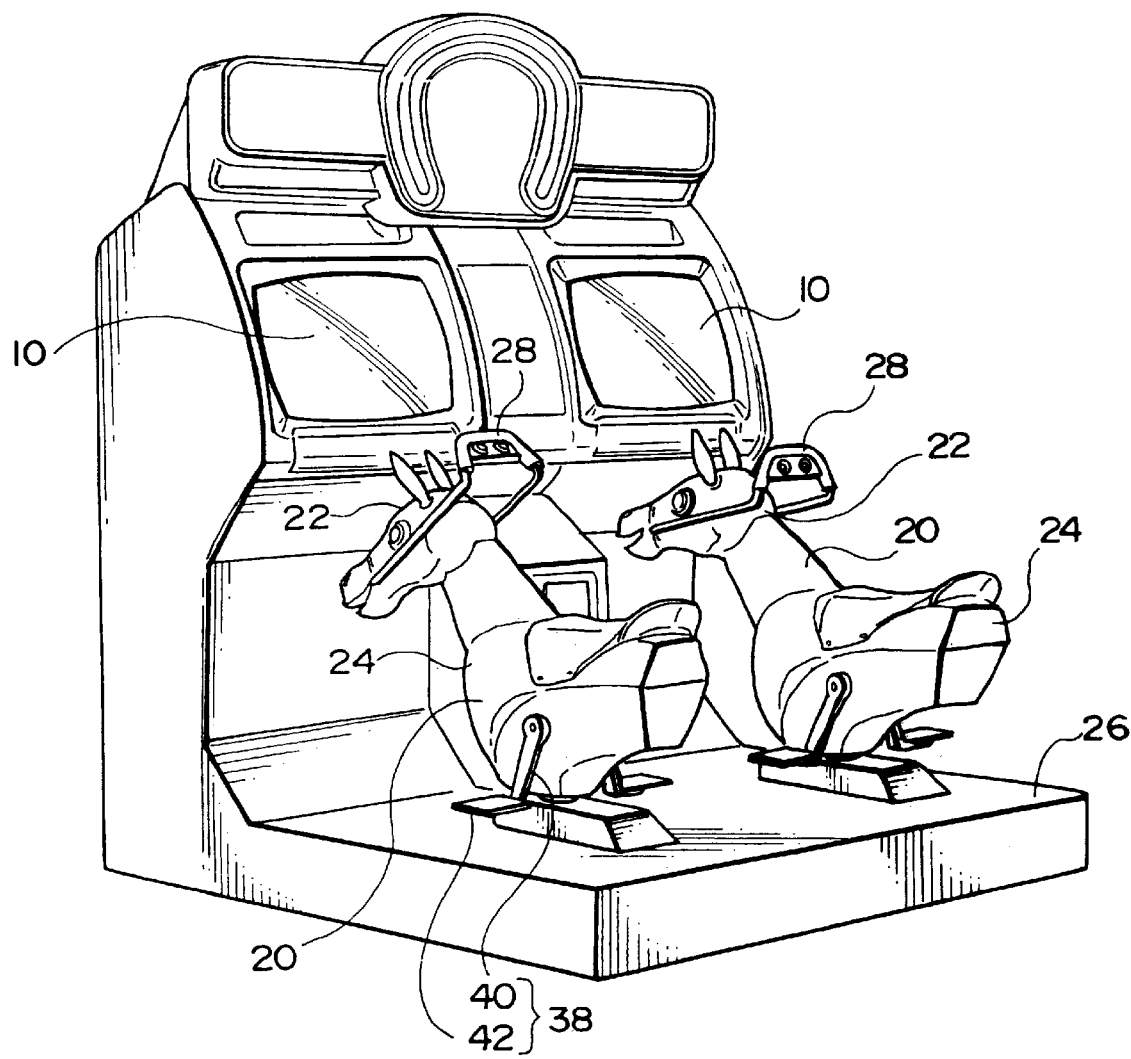
FIG. 2 shows an embodiment of the pleasure ride device.

FIG. 2 shows an embodiment of the pleasure ride device. This pleasure ride device has two displays 10 and two model animal devices 20. In the displays 10 is shown the appearance of a horse race, according to information from the model animal devices 20. (See FIG. 4.) Correspondingly, the model animal devices 20 are constructed to model racing horses.

Figure 1:
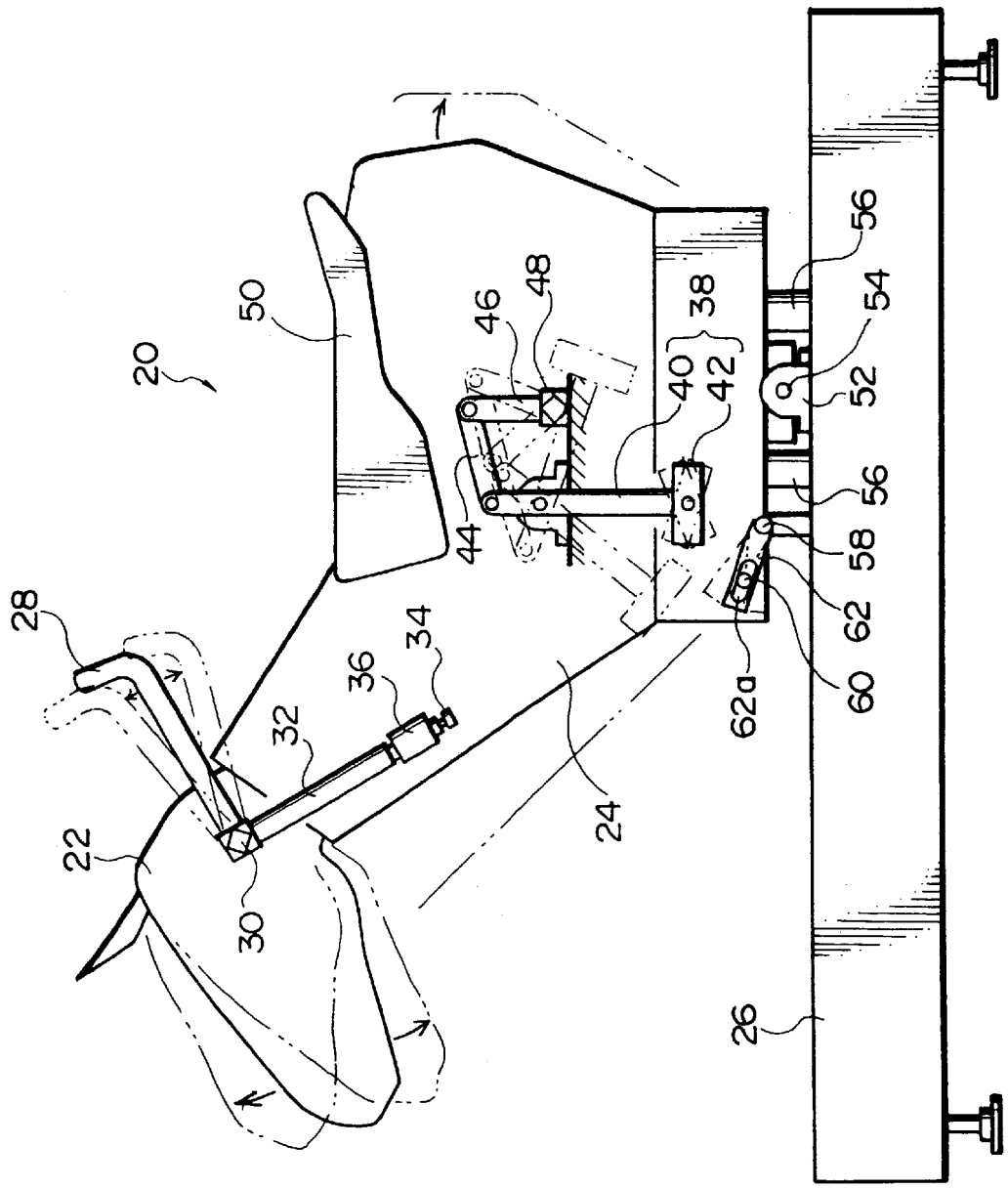
FIG. 1 is a schematic illustration of a model animal device.
Figure 3:
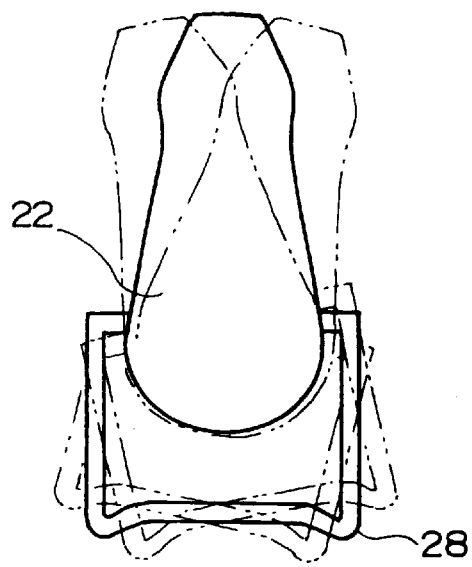
FIG. 3 is a plan view of a head portion.

FIG. 1 is a schematic illustration of a model animal device. This model animal device 20 has a main unit comprising a head portion 22 and a body portion 24, and a base 26 supporting the body portion 24 so that the latter can rock. FIG. 3 is a plan view of the head portion.

The head portion 22 is provided with reins 28 formed by a bent metal bar. The reins 28 are arranged to rotate through an angle of approximately 30 degrees through a fixing portion 30 provided within the head portion 22. Here the head portion 22 is fixed to the reins 28, and moves vertically together with the reins 28. It should be noted that the fixing portion 30 allows the reins 28 to rotate while applying a reaction force.

The head portion 22, as shown in FIG. 3, rotates horizontally with the reins 28. The reins 28, as shown in FIG. 1, by means of a rotating shaft 32 fixed to the fixing portion 30, rotate a rotary variable resistor 34. By means of this rotary variable resistor 34, the orientation of the reins 28 and head portion 22 can be detected. Further, a reaction force generator 36 exerts a reaction force on the rotating shaft 32, urging the latter in the rotary direction opposite to the direction of rotation.

Next, the body portion 24 is provided with footrests 38. Each footrest 38, like bicycle pedals, comprises a crank arm 40 at one end of which is attached orthogonally a pedal 42. The pedal 42 rotates, restricted to a range of approximately 20 degrees. The crank arm 40 is arranged to swing, restricted to a range from a base position pointing vertically downwards of approximately 45 degrees forwards and 70 degrees to the rear. Further, within the body portion 24, at the other end of the crank arm 40, one end of a link 44 is rotatably coupled, and at the other end of the link 44, one end of a lever 46 is rotatably coupled. The other end of the lever 46 is attached to a fixing portion 48. The fixing portion 48 imparts a reaction force to the lever 46, while allowing the lever 46 to rotate.

In this way, the crank arm 40, link 44, and lever 46 constitute a crank mechanism, and the rocking motion of the crank arm 40 is transmitted to become a rocking motion of the lever 46. Since a reaction force is imparted by the fixing portion 48 to the lever 46, at attempt to rock the crank arm 40 is met with an opposing reaction force.

The body portion 24 is also provided with a seat 50. However, the player does not sit in the seat, but rather crouches to play the game. The body portion 24 is mounted on the base 26 so as to be able to rock. That is to say, a bearing 52 provided on the base 26 rotatably supports an axle 54 provided on the underside of the body portion 24, whereby the body portion 24 is able to rock. Furthermore, between the body portion 24 and the base 26 is interposed a resilient member 56 of rubber, which imparts a reaction force against the rocking of the body portion 24.

Furthermore, the angle $\theta$ at which the body portion 24 is inclined is detected by a rotary variable resistor 58 fixed to the base 26. That is to say, a rocking lever 62 is fixed to the rotary shaft (not shown in the drawing) of the rotary variable resistor 58, and a pin 60 is provided on the body portion 24. The pin 60 is disposed within a slot 62a formed in the rocking lever 62, and with the rocking of the body portion 24, the pin 60 moves substantially vertically, whereupon correspondingly the rocking lever 62 also moves vertically, and the angle of inclination $\theta$ is detected by the rotary variable resistor 58.

Figure 8:
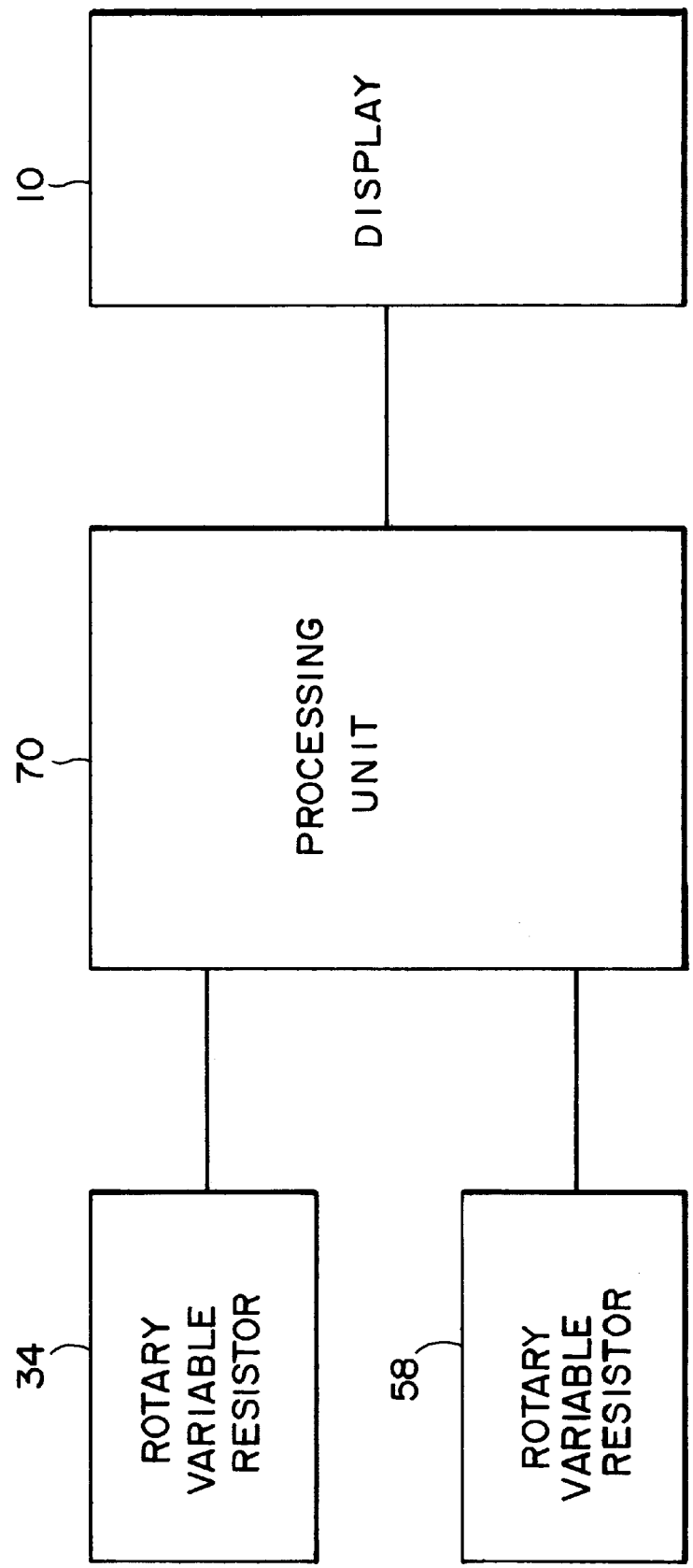
FIG. 8 is a functional block diagram of the model animal device of this embodiment.

FIG. 8 is a functional block diagram of the pleasure ride device of this embodiment.

As described above, the orientation (in the horizontal plane) of the reins 28 and head portion 22 detected by the rotary variable resistor 34, and the angle of inclination $\theta$ in the vertical plane of the body portion 24 detected by the rotary variable resistor 58 are input to a processing unit 70.

Figure 4:
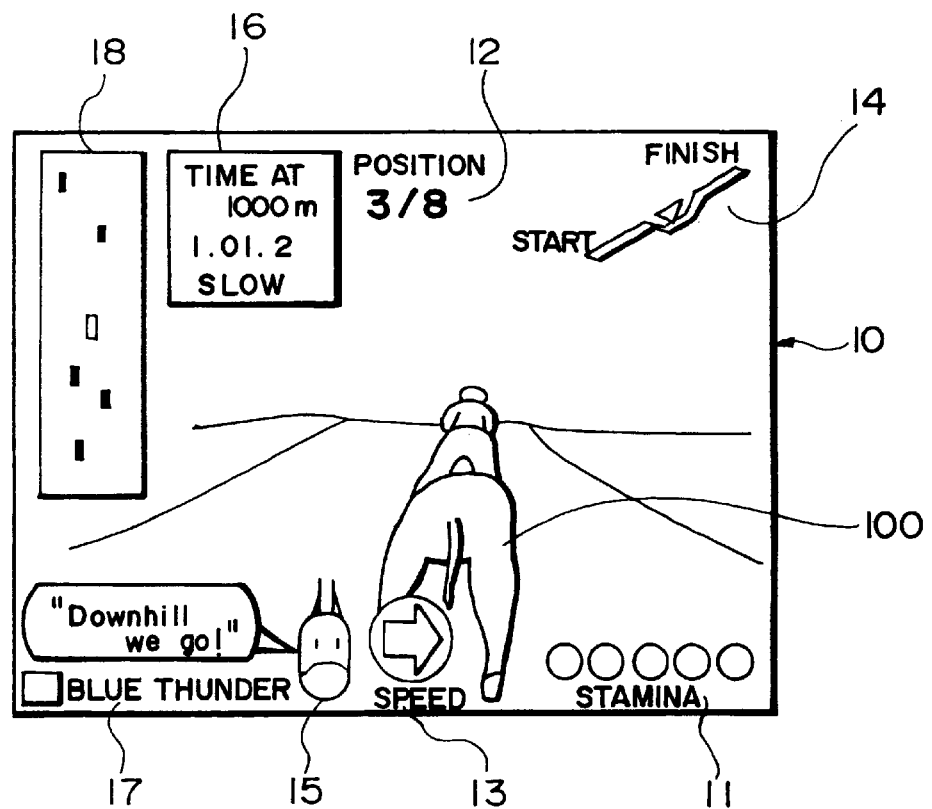
FIG. 4 shows a screen display during the game of this embodiment.

The processing unit 70 comprises a ROM in which is stored a program and other data, a RAM, and a CPU, and based on the input signals from the resistors 34 and 58 and a predetermined game program, computes the virtual space in which the horse representing the model animal device 20 straddled by the player appears, and shows this game image on the displays 10. FIG. 4 shows an example game image.

FIGS. 5A to 7A illustrate the method of operation of the model animal device 20 of this embodiment.

Figure 5A:
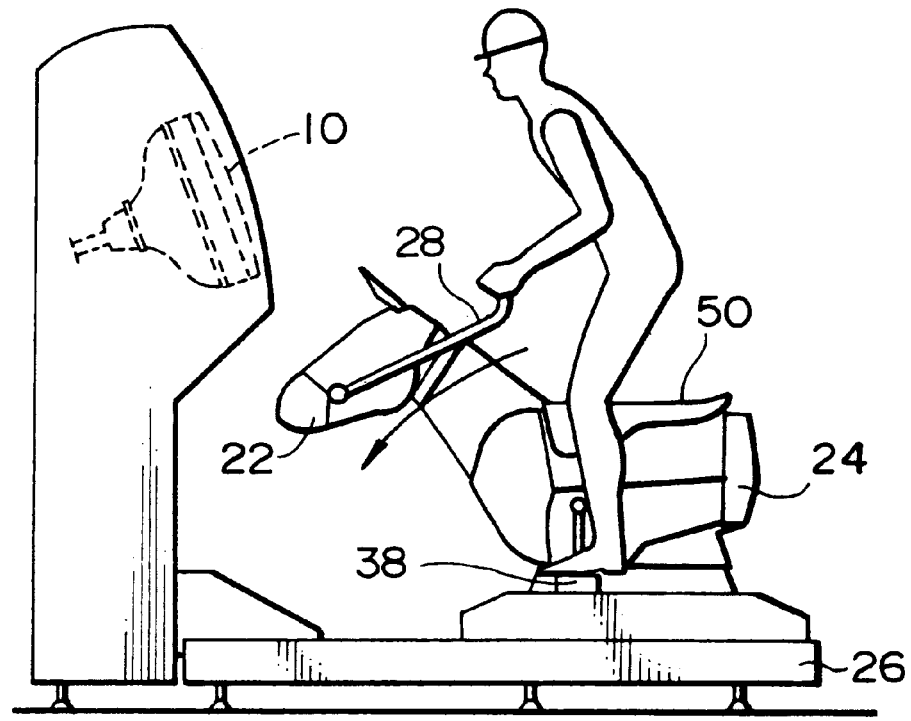
FIG. 5A shows an example of the model animal device of this embodiment in an operation state.

First, as shown in FIG. 5A, the player mounts the pedals 42 of the footrests 38 and hold the reins 28. At this time a message appears on the display 10 warning the player not to sit on the seat 50. Then when the game is started the horse race begins. The display 10, as shown in FIG. 4, shows a rear view of the horse being ridden by the player, from a third-person perspective. The player pulls on or pushes down the reins 28, and rocks the body portion 24, thus controlling the horse 100 in virtual space.

Specifically, the direction of progress of the horse is determined by the lateral bending of the reins 28 as shown in FIG. 3, thus directing the head portion 22 in any particular orientation. This orientation is detected by the rotary variable resistor 34 shown in FIG. 1.

Figure 7A:
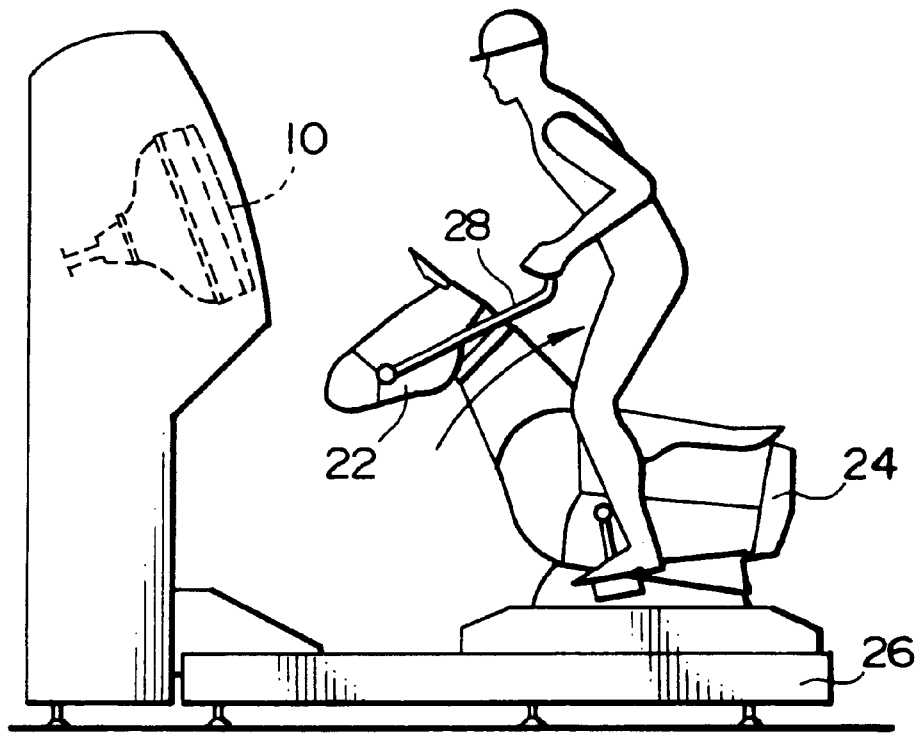
FIG. 7A shows an example of the model animal device of this embodiment in still another operation state.

The speed of the horse is determined by the magnitude of the angle of inclination $\theta$ of the body portion 24. In other words, the speed of the horse is determined by the magnitude of the angle of inclination $\theta$ when the body portion 24 is rocked in the longitudinal plane. The larger the magnitude of the angle of inclination $\theta$, the more is the horse accelerated and the speed increased. In detail, from the neutral position of the body portion 24, as shown in FIG. 5A, the reins 28 are pushed down and the body portion 24 rocked forward, and next as shown in FIG. 7A the reins 28 are pulled up, and the body portion 24 is rocked back, and this motion is carried out repeatedly, rocking the body portion 24. At this time, in order that the head portion 22 is always facing in the same direction, it is arranged to be inclined in the direction opposite to the direction of inclination of the body portion 24. It should be noted that the angle of inclination θ is detected by the rotary variable resistor 58 shown in FIG. 1.

When the body portion 24 is rocked, according to the player's pose, the footrests 38 are also rocked. However, the angle of rocking of the footrests 38 is unrelated to the speed and acceleration of the horse 100.

Thus, in this embodiment, a player astride the model animal device 20 bends the reins 28 laterally to point the head portion 22 in any desired direction, thus controlling the direction of progress of the horse 100, and further moves the reins 28 vertically and rocks the body portion 24 in the longitudinal plane, thereby being able to cause the horse 100 to run with a speed and acceleration determined by the angle of inclination θ.

The characteristic of this embodiment lies in fact that based on the angle of inclination θ with which the body portion 24 is rocked in the longitudinal plane, for each cycle of the rocking motion the motion acceleration α of the horse 100 is computed, and the acceleration control of the horse 100 in the virtual space is carried out. More specifically, in synchronization with the hooves of the horse 100 shown in the display hitting the ground, a discontinuous acceleration is applied to the horse 100.

The details thereof are now described.

Figure 9:
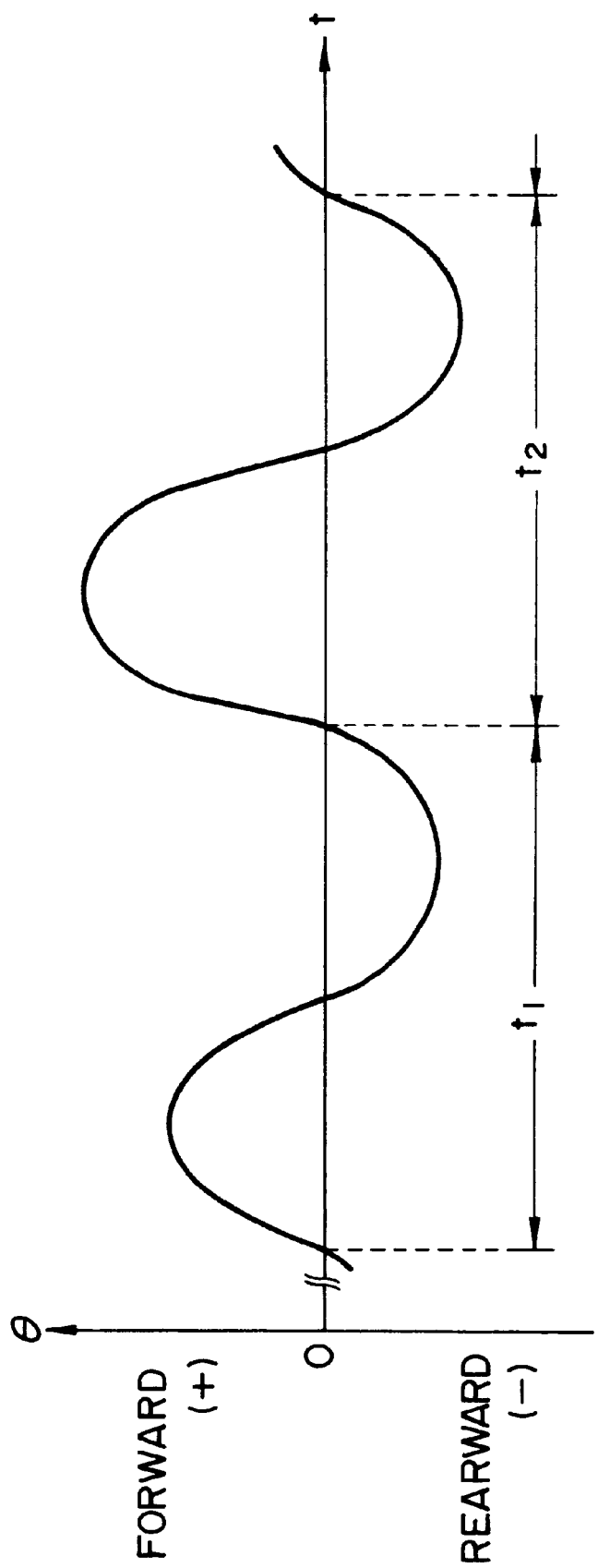
FIG. 9 is a graph for illustrating the rocking action of the model animal device.
Figure 10:
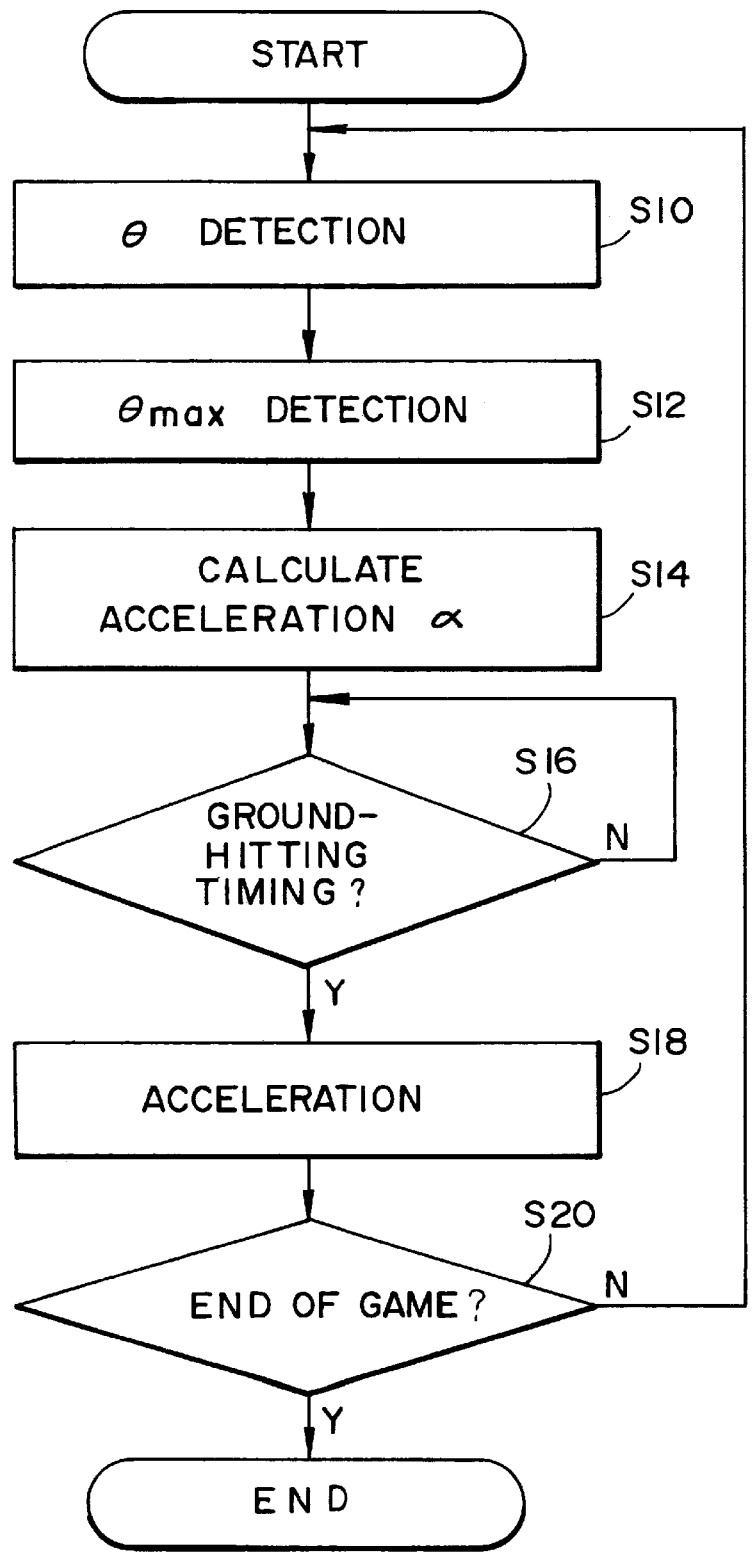
FIG. 10 is a flowchart of the acceleration control of the player character during the game of this embodiment.

In FIG. 9, the variation of the angle of inclination θ of the model animal device 20 being rocked in the longitudinal plane by the player is shown, and in FIG. 10 is shown a flowchart of the acceleration control of the horse 100 in virtual space based on the detected angle of inclination θ.

The player increases the degree of rocking of the model animal device 20 to make the horse 100 run faster, and decreases the degree of rocking to reduce speed. At this time the angle of inclination θ of the model animal device 20, or more specifically the angle of inclination θ of the body portion 24 is detected using the rotary variable resistor 58, and input to the processing unit 70 (Step S10).

The processing unit 70, based on this input value of the detected angle of inclination θ detects the maximum angle of inclination $θ_{MAX}$ for each of the rocking cycles t1, t2, ..., as shown in FIG. 9. This maximum angle of inclination may be measured as separate maximum angles of inclination in the forward and rearward directions, or may be detected as the amplitude of the angle between the peak values in the forward and rearward directions (Step S12).

In this way, when the maximum angle of inclination $θ_{MAX}$ of the model animal device 20 is detected, based on this detected value, the running situation of the horse 100, and other factors, the acceleration α of the horse 100 is computed (Step S14). That is to say, the processing unit 70 functions as an acceleration computing means, and computes the acceleration a of the horse 100 for each rocking cycle.

Next, a decision is made as to the current state of the horse 100 in virtual space, and the timing of hitting of the ground by the hooves of the horse 100 is detected (Step S16).

In other words, as shown in FIGS. 5A to 7A, when the player riding the model animal device 20 rocks the body portion 24 in the longitudinal plane, the horse 100 in the virtual space also moves, as shown in FIGS. 5B to 7B in synchronization with this rocking in the longitudinal plane.

Figure 5B:
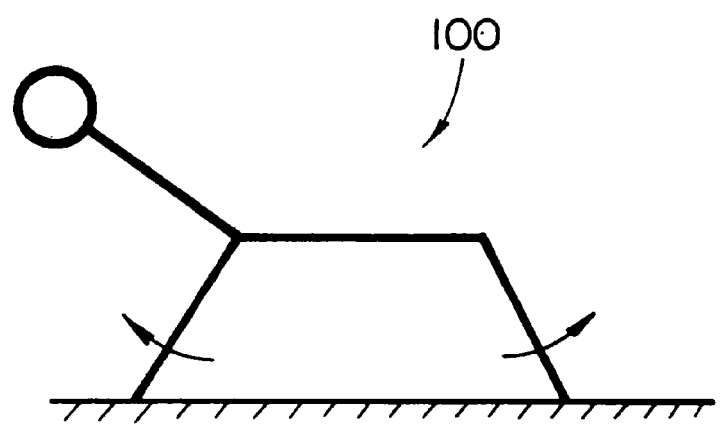
FIG. 5B is a schematic drawing of the action of the player character running in virtual space in synchronization with the operation.
Figure 6A:
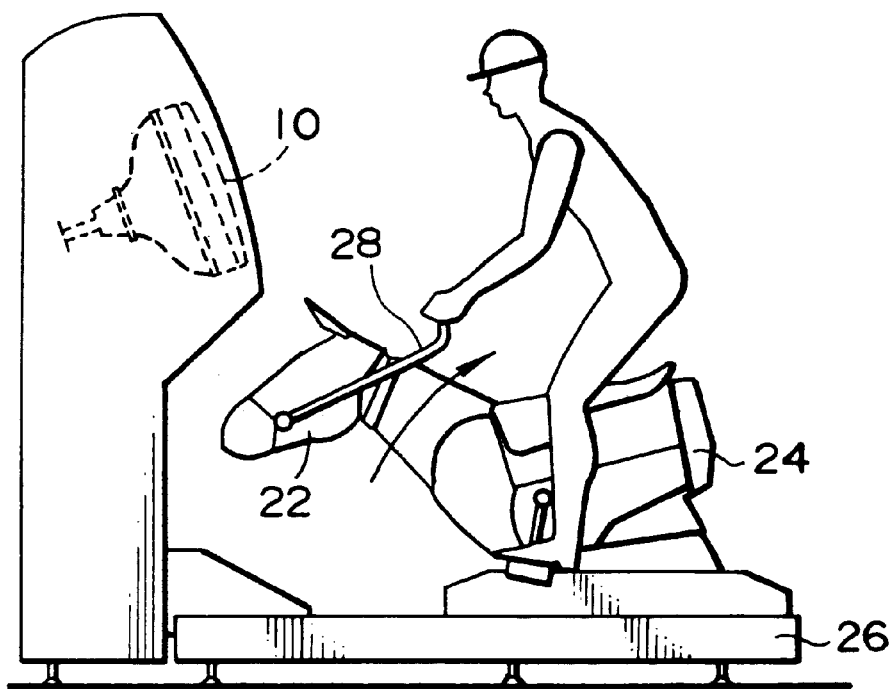
FIG. 6A shows an example of the model animal device of this embodiment in another operation state.
Figure 6B:
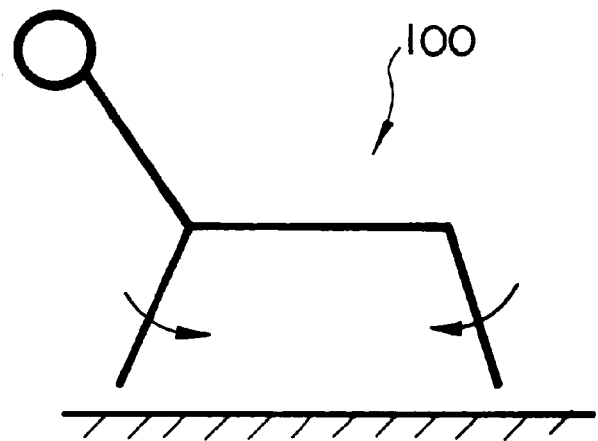
FIG. 6B is a schematic drawing of the action of the player character controlled in synchronization with the operation.
Figure 7B:
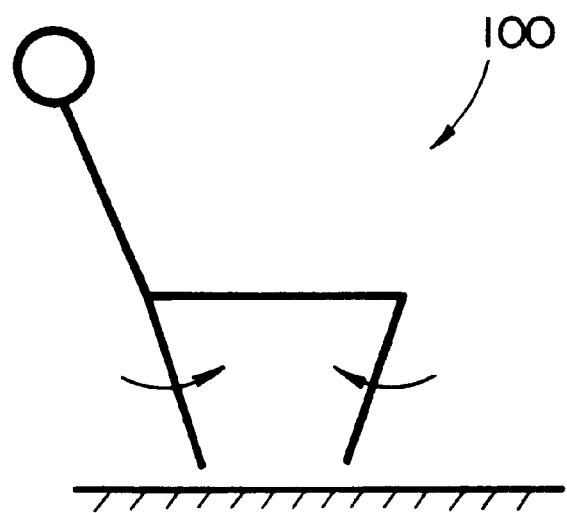
FIG. 7B is a schematic drawing of the action of the player character controlled in synchronization with the operation.

At this time, as shown in FIG. 5B, when the player rocks the body portion 24 forward, the horse 100 carries out the action of its hooves hitting the ground 110, and as shown in FIGS. 6B and 7B, when the body portion 24 is rocked rearward, the state is not that of having the hooves hitting the ground.

In the processing unit 70 of this embodiment, for each rocking cycle, based on the data such as the angle of inclination of the model animal device 20, the timing of the hitting of the ground 110 by the hooves of the horse 100 is detected (Step S16), and on the timing of this ground-hitting, a computation of the acceleration of the horse 100 within the virtual space by an acceleration α is carried out (Step S18). That is to say, the processing unit 70 functions as an acceleration computing means which is synchronized to the hooves of the horse 100 hitting the ground, and computes the acceleration of the horse in virtual space.

Thus the sequence of acceleration control of steps S10 to S20, as shown in FIG. 9, is executed repeatedly for each rocking cycle of the model animal device 20, and the horse 100 shown on the display 10 undergoes acceleration control discontinuously in synchronization with the timing of the hooves hitting the ground 110.

By this means, the horse 100 in the display 10 can be controlled to give an impression close to that of a real horse, and the player can enjoy riding the horse 100 of high realism displayed in the display 10, and play the game.

In addition to the horse described above, as shown in FIG. 4, in the display 10 various information computed by the processing unit 70 can be displayed. For example, in the center of the screen at the top is shown a ranking indication 12, and in the upper right corner is shown a navigation section 14 showing the course and the current position. To the left of the ranking indication 12 appears a progress display 16 showing the timing of the leading horse passing certain points, and whether the pace is fast or slow. Then to the left of the progress display 16 appears a position indication 18 showing the player's horse with respect to the other horses. Further, in the lower right corner of the display 10 appears a stamina meter 11 showing the degree to which the player's horse's stamina has been used up, and in the center of the screen at the bottom appears an acceleration meter 13 showing whether the player's horse is accelerating or decelerating. To the left of this, appears a horse message 15 showing the horse's status. In this drawing the status indicated is that the horse is proceeding downhill. To the left of this is shown the player's horse's number and name in an identifier indication 17. Further, when the leading horse passes a certain point close to the finish line, this fact is also indicated.

It should be noted that the present invention is not limited to the above described embodiment, and various modifications are possible. For example, the above embodiment has two displays 10 and model animal devices 20, allowing two players to play, but with a larger number of displays 10 and model animal devices 20, a larger number of players can take part.

In the embodiment described above, the example is of a game in which a horse is controlled in virtual space, using a model animal device 20, but the present invention is not limited to this, and can be applied to a wide range of cases in which a game is played by manipulating characters representing other animals or imaginary animals.

What is claimed is:

1. A pleasure ride device comprising:
   a model animal device having the form of a model animal, with a main part rocked longitudinally by a straddling player, and controlling a player character representing said animal in virtual space;

a rocking angle detection means for detecting a rocking angle of said model animal device; and a computing means for computing and showing on a display a virtual space in which said player character appears, based on a predetermined game program and the detected rocking angle;

wherein said computing means includes an acceleration computing means which computes the motion acceleration for each rocking cycle of said model animal device, based on the detected rocking angle, and for each rocking cycle of said model animal device, accelerates said player character within said virtual space at a certain timing.

2. The pleasure ride device as defined in claim 1, wherein said computing means accelerates said player character in synchronization with the feet of said player character hitting the ground.

3. The pleasure ride device as defined in claim 2, wherein said model animal device has the form of a model animal having a head portion and a body portion, and a player straddles said body portion, seizes reins provided on said head portion, stands on a pair of footrests provided on said body portion, and operates so as to control said animal in virtual space.

4. The pleasure ride device as defined in claim 3, wherein said model animal device is such that by vertical movement of said reins, said body portion is rocked longitudinally, and said footrests are rocked longitudinally according to the attitude of said player's body.

5. The pleasure ride device as defined in claim 1, wherein said model animal device has the form of a model animal having a head portion and a body portion, and a player straddles said body portion, seizes reins provided on said head portion, stands on a pair of footrests provided on said body portion, and operates so as to control said animal in virtual space.

6. The pleasure ride device as defined in claim 5, wherein said model animal device is such that by vertical movement of said reins, said body portion is rocked longitudinally, and said footrests are rocked longitudinally according to the attitude of said player's body.

7. The pleasure ride device as defined in claim 1, wherein said acceleration computing means includes:
a first means which, based on the detected rocking angle, computes the motion acceleration of said player character for each rocking cycle of said model animal device; and
a second means for, based on the motion acceleration, accelerating said player character for each rocking cycle of said model animal device.

8. The pleasure ride device as defined in claim 7, wherein said first means computes the motion acceleration for each rocking cycle, based on the maximum rocking angle in each rocking cycle and the game conditions.

9. The pleasure ride device as defined in claim 1, wherein said acceleration computing means includes:
a first means which, based on the detected rocking angle, computes the motion acceleration of said player character for each rocking cycle of said model animal device; and
a second means for, based on the motion acceleration, accelerating said player character in synchronization with the feet of said player character hitting the ground.

10. The pleasure ride device as defined in claim 9, wherein said first means computes the motion acceleration for each rocking cycle, based on the maximum rocking angle in each rocking cycle and the game conditions.

* * * * *